UNITED STATES PATENT OFFICE.

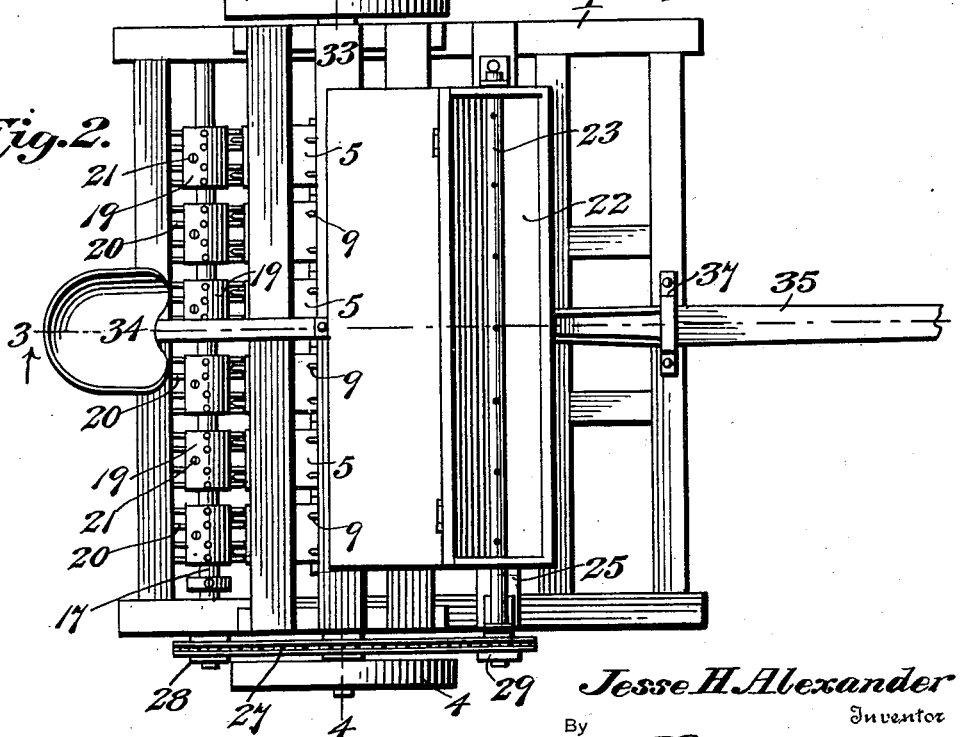

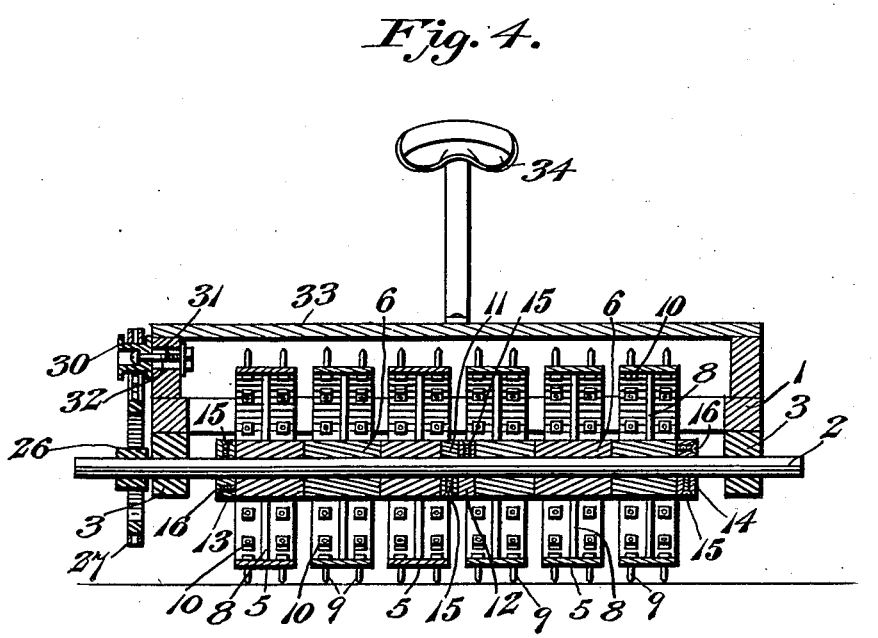

JESSE HENLEY ALEXANDER, OF LABELLE, MISSOURI.

COMBINED HARROW AND PLANTER.

SPECIFICATION forming part of Letters Patent No. 681,944, dated September 3, 1901.

Application filed July 14, 1900. Serial No. 23,642. (No model.)

*To all whom it may concern:*

Be it known that I, JESSE HENLEY ALEXANDER, a citizen of the United States, residing at Labelle, in the county of Lewis and State of Missouri, have invented a new and useful Combined Harrow and Planter, of which the following is a specification.

My present invention relates to a novel cultivator and planter, the object of the invention being to combine in a single farm implement a cultivating-harrow or ground-mellowing device and a planting attachment designed to be employed at proper seasons for the distribution of clover or other grass seeds immediately in advance of the device or implement which is intended to mellow the ground and insure the penetration of the seeds through the stubble and turf to the soil or loam.

It is well understood by farmers that the rains and severe weather of the winter months wash the decayed vegetation into the hollows, sluices, and drain-ditches, so that the meadow is deprived of the fertilizing properties of such vegetation, with the result that meadow lands become sod-bound and comparatively barren. The result of this condition of the land may be clearly noted in the spring, when the young grass will appear first in the hollows and depressions, where the decayed vegetation has enriched the soil and where the ground is in condition to be permeated by the warm air.

Having these conditions in mind, the object of my invention is to provide a meadow harrow or cultivator intended to be used in any and all seasons for the purpose of mellowing grass-lands by working the vegetation into the soil and by loosening the latter to a depth of several inches for the purpose of facilitating a circulation of air through the surface of the loam, to the end that the productiveness of the land may be greatly increased.

A further object of the invention is to construct and relate the elements of the harrow in a manner to permit the use of the implement for the purpose of cultivating corn and the like.

To the accomplishment of the several objects stated the invention consists in the construction and arrangement of parts to be hereinafter fully described, illustrated in the drawings, and pointed out in the appended claims.

In said drawings, Figure 1 is a perspective view of my combined harrow and cultivator complete. Fig. 2 is a top plan view thereof. Fig. 3 is a central longitudinal section on the line 3 3 of Fig. 2. Fig. 4 is a transverse section on the line 4 4 of Fig. 2.

Referring to the reference-numerals designating corresponding parts in the several views, 1 indicates the frame of the implement, which is of skeleton form and supported upon what I shall term the "harrow-shaft" 2, extended beyond the bearings 3 for the reception of movable carrying-wheels 4, designed to be employed for the conveyance of the implement from field to field or over roads and to be removed when the implement is employed for the working of ground. Upon the shaft 2, intermediate of the bearings 3, which drop from the side bars of the frame, are loosely mounted a number of harrow-wheels 5, comprising hubs 6 and comparatively broad rims 7, retained upon the hubs by spokes 8. The rim 7 of each of the harrow-wheels 5 is pierced by two circumferential series of apertures through which project diamond or other suitably shaped teeth 9, the shanks of which are rigidly retained in the wheel-rims by nuts 10.

The wheels 5, which are preferably though not necessarily six in number, are divided into two relatively adjustable series by a pair of spacing-collars 11 and 12, mounted upon the shaft 2 and each abutting against the hub of the inner end wheel of a series of wheels retained against the spacing-collar by the adjustable thrust-collars 13 and 14. Each of the collars 11, 12, 13, and 14 is provided with a set or abutment screw 15, by means of which they are adjustably retained upon the shaft 2, and the end or thrust collars 13 and 14 are additionally provided with thrust-screws 16, extending through the collars and abutting against the contiguous faces of the hubs of the outer or end wheels. It is evident that the several collars may be loosened from the shaft 2 and may be shifted thereon to shift each series of wheels toward or from each other for the purpose of locating all of the wheels in equidistant relation or of separating the series by a space sufficient to permit the use of the implement for the cultivation of corn. It will also appear that each series of wheels may be retained in fixed relation to the shaft by screwing up the thrust-screw 16, which serves to clamp the adjacent series of harrow-wheels against the spacing-collars 11 and 12, rigidly retained upon the shaft 2 at the opposite ends of the series. I wish it to be understood, however, that many expedients might be employed for effecting the adjustment of the wheel series and their retention in fixed relation to the shaft after the adjustment is effected, the mechanism which I have shown for this purpose being illustrated merely for the purpose of disclosing one embodiment of such means.

Immediately behind the harrow-wheel is located a rotary clearing device comprising a clearing-shaft 17, journaled in bearings 18, depending from the side bars of the frame 1, and a series of adjustable clearing-blocks 19, preferably of cylindrical form and each corresponding in length to the width of the adjacent harrow-wheel with which it is designed to coöperate. The clearing-blocks 19 are each provided with four circumferential series of clearing-teeth 20, arranged in pairs, each pair defining a space through which the harrow-teeth 9 of the adjacent wheel pass to be cleared. Any suitable means for retaining the clearing-blocks 19 adjustably upon the clearing-shaft 17 may be employed; but one embodiment of such means comprehends the set-screws 21, extending through the blocks and abutting against the shaft to retain said blocks in proper position to clear the adjacent harrow-wheels, notwithstanding the lateral adjustment of the latter to accommodate the implement to various conditions of use.

The device as thus far described constitutes a complete embodiment of my invention in its broadest aspect, since it comprehends a series of relatively adjustable harrow-wheels combined to form what is, in effect, a crushing or rolling cylinder having teeth for effectually mellowing and aerating the ground; but inasmuch as it is desirable to equip the implement with planting or seed-sowing mechanism I mount a seedbox or hopper 22 upon the frame in advance of the harrow and fitted, as usual, with a perforated dropper-shaft 23, arranged to govern the distribution or dropping of the grass or other seeds from the box 22 through an elongated slot or feed-opening 24, formed in a feed-box-supporting rail 25, bolted or otherwise secured upon the frame.

For the purpose of operating the clearer and planter from the shaft 2, which is rotated by the traction of the harrow-wheels, I mount a comparatively large sprocket-wheel 26 upon the shaft 2 just beyond one of the bearings 3 and geared, as by a sprocket-chain 27, with somewhat smaller sprocket-wheels or pinions 28 and 29, keyed upon the adjacent ends of the clearer-shaft 17 and the dropper-shaft 23. The proper tension of the sprocket-shaft 27 may be and preferably is maintained by an adjustable tension device 30, supporting the upper strand of the chain and carried by a stud-shaft 31, extending through a vertical slot 32 in one end of a guard-frame 33 and retained in its adjusted positions by a nut 24. The guard-frame 33 comprehends a superstructure of the frame 1 and extends over the harrow. It also serves as a support for the driver's seat 34.

Any suitable arrangement of draft appliances may be fitted to the implement as thus far described—as, for instance, by mounting a draft-tongue 35 at the front of the frame and retained by a clevis 36 and a keeper 37.

In operation the implement is drawn over the ground, and the stubble and decaying vegetation are packed down by the passage of the wheels and worked into the ground by the penetration of the teeth 9. The teeth 9 thoroughly work and mellow the ground, opening it up for the inflow of warm air, and are effectually cleared as they rise from the surface of the ground by passing between the clearing-teeth of the revolving clearer. At the same time if it is desired to sow grass or other seed simultaneously with the working of the ground the seedbox is supplied and the seeds are dropped in proper quantities in front of the advancing harrow, the teeth of which insure the deposit of the seed through the stubble and turf to the soil therebelow. If it is desired to cultivate corn or the like, the harrow-wheels are adjusted to form a series of wheels at opposite sides of an intermediate space, and the clearer-blocks are adjusted upon the clearer-shaft in order to maintain their proper coöperative proximity to the teeth of the wheels.

It will thus be observed that I have produced a simple and ingenious farm implement by means of which the various objects heretofore stated may be accomplished; but while the present embodiment of my invention appears at this time to be preferable I desire to reserve the right to effect such changes, modifications, and variations both in form and arrangement as may fall properly within the spirit of the invention.

I am aware that it has been proposed to mount a series of clearing-teeth in operative proximity to a cylinder having teeth disposed in such alternating arrangement that during one portion of the revolution of the cylinder the teeth thereof will pass through alternating spaces between the clearer-teeth, and in another position thereof the teeth mounted upon the cylinder will pass through the spaces previously left clear. By this construction the spaces between the pairs of teeth are not left constantly clear for the escape of such vegetation as may have been carried up above the clearing-teeth by the teeth of the cylinder. I do not lay claim to this construction, but to that structure recited in the claims which provides for the constant clearance or absence of obstruction between the pairs of clearing-teeth, inasmuch as the spaces between the series of separate pairs of teeth are not provided for the accommodation of the teeth upon the cylinder or harrow-wheels.

What I claim is—

1. A farm implement comprising a frame, a harrow-wheel provided with several circumferential series of teeth, and a clearing device having a series of separate pairs of clearing-teeth for each series of harrow-teeth, the spaces between the series of pairs of clearing-teeth being opposed to the spaces between the series of harrow-teeth.

2. A farm implement comprising a frame, a harrow-wheel provided with several circumferential series of teeth, and a rotary clearing device having a series of separate pairs of clearing-teeth for each series of harrow-teeth, the spaces between the series of pairs of clearing-teeth being opposed to the spaces between the series of harrow-teeth.

3. A farm implement comprising a frame, a series of harrow-wheels provided with several circumferential series of teeth, and a series of clearing-blocks opposed to the harrow-wheels and provided with series of separate pairs of clearing-teeth for the series of harrow-teeth, the spaces between the series of pairs of clearing-teeth being opposed to the spaces between the series of harrow-teeth.

4. A farm implement comprising a frame, a series of coaxial adjustable harrow-wheels each provided with several circumferential series of teeth, and a series of coaxial, rotary clearing-blocks adjustable for the purpose of accommodating them to the adjusted positions of the harrow-wheels, each of said clearing-blocks being provided with series of separate pairs of clearing-teeth for the series of harrow-teeth upon the adjacent harrow-wheel, the spaces between the series of pairs of clearing-teeth being opposed to the spaces between the series of harrow-teeth.

5. A farm implement comprising a frame, a series of relatively adjustable harrow-wheels each provided with a series of harrow-teeth, a coöperating series of independently-adjustable clearing devices having series of separate pairs of clearing-teeth for the series of opposed harrow-teeth, the spaces between the series of pairs of clearing-teeth being disposed between the series of harrow-teeth, and means for simultaneously operating the several wheels and clearing devices.

6. In a farm implement, the combination with a frame and driving-shaft, of a plurality of harrow-wheels mounted upon the shaft and arranged in separate relatively adjustable series, securing means common to the several wheels of each series, a clearer-shaft, a plurality of independently-adjustable clearing-blocks arranged for individual coöperation with the harrow-wheels, said harrow-wheels being provided with the harrow-teeth and said clearing-blocks being provided with series of separate pairs of clearing-teeth disposed for the reception of the harrow-teeth.

7. In a farm implement, the combination with a frame and shaft, of a plurality of harrow-wheels mounted upon the shaft in series, collars opposed to the wheels at the opposite ends of each series, means for retaining said collars upon the shaft, and means carried by the collars for operatively connecting the several wheels of each series to permit their simultaneous adjustment.

8. In a farm implement, the combination with a shaft, harrow-wheels mounted in series thereon, collars adjustably mounted upon the shaft and opposed to the opposite ends of each series, and a thrust-screw carried by the collar at one end of each series and bearing against the adjacent harrow-wheel for the purpose of clamping the several harrow-wheels of each series for simultaneous actuation.

9. In a farm implement, the combination with a harrow-shaft, of a plurality of harrow-wheels mounted in series on said shaft, adjustable collars confining the wheels of each series, a rotary clearing-shaft, a series of cylindrical clearing-blocks mounted upon said shaft, each of said blocks being opposed to the periphery of a harrow-wheel, means for fixing said blocks in their adjusted positions, harrow-teeth extending from the peripheries of the harrow-wheels, paired clearing-pins extending from the peripheries of the clearing-blocks, and gearing intermediate of the harrow-shaft and clearer-shaft to effect the simultaneous rotation of the harrow and clearing device.

10. In a farm implement, the combination with a frame and driving-shaft, of a plurality of harrow-wheels mounted upon the shaft and arranged in separate relatively adjustable series, adjustable collars confining the several wheels of each series, a clearer-shaft, a plurality of independently-adjustable clearing-blocks mounted on the clearer-shaft and arranged for individual coöperation with the harrow-wheels, said harrow-wheels being provided with harrow-teeth and said clearing-blocks being provided with clearing-teeth disposed to clear the harrow-teeth and located out of contact with the ground.

In testimony that I claim the foregoing as my own I have hereto affixed my signature in the presence of two witnesses.

JESSE HENLEY ALEXANDER.

Witnesses:
CHAS. W. MULNIX,
C. H. BROSIUS.